May 31, 1955   H. PHILLIPS   2,709,554
FISHING REEL
Filed Sept. 16, 1954

INVENTOR
*Harry Phillips*

BY *Cushman, Darby & Cushman*
ATTORNEYS

United States Patent Office 2,709,554
Patented May 31, 1955

2,709,554

FISHING REEL

Harry Phillips, Winston-Salem, N. C.

Application September 16, 1954, Serial No. 456,416

6 Claims. (Cl. 242—84.4)

My invention relates to fishing reels and the like, and more particularly to an improved level winding mechanism for fishing reels of the surf casting type.

In the conventional surf casting fishing reel, the level winding mechanism is directly connected to the spool so as to operate therewith during both the reeling-in operation and the casting operation. Consequently, since the mechanism will be moved at extremely high speeds during a cast, a great deal of wear occurs which materially reduces the useful life of the mechanism. Likewise, since the line guiding element of the mechanism is constantly in contact with the line as it pays out during a cast, this frictional contact results in excessive wear both in the line and the guiding element of the mechanism.

Moreover, both the movement of the mechanism and the line contact with the guiding element cause considerable drag which will retard the action of the reel during a cast, thus cutting down the effective length of cast which is possible.

With the above in mind, my invention contemplates a novel level winding mechanism which overcomes the difficulties mentioned by providing a simple and unique structure which is easy to operate and economical to manufacture.

Briefly, my invention contemplates the provision of a level winding mechanism for use with a conventional reel of the surf casting type or the like, which is constructed and arranged to be disconnected from the spool and maintained in an inoperative position during a cast so as to eliminate the excessive wear and cast retarding effect heretofore noted. Moreover, my invention further contemplates the provision of a novel line guiding element which is constructed and arranged to properly maintain and guide the line during the reeling-in operation, but which enables the operator to quickly and easily remove the line therefrom to permit a cast to be made with the line free to pay out, thereby eliminating the excessive wear and cast retarding effect heretofore experienced in this regard.

Accordingly, the primary object of my invention is the provision of a level winding mechanism which may be disconnected from driving relation with the spool so that it may be disposed in an inoperative position during the casting operation.

Another object of my invention is the provision of a novel line guiding element which permits the line to be quickly and easily inserted therein and removed therefrom, but yet effectively maintains the line in proper relation during either casting or reeling in.

These, and other objects of my invention, will become more apparent during the course of the following detailed description and appended claims.

The invention may best be understood with reference to the accompanying drawings wherein an illustrative embodiment is shown.

Figure 1:
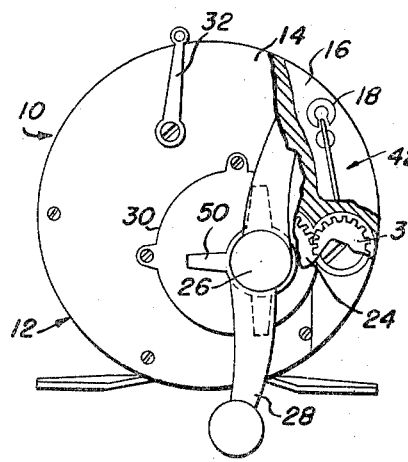
Figure 1 is a side elevational view of a fishing reel embodying the principles of my invention.
Figure 2:
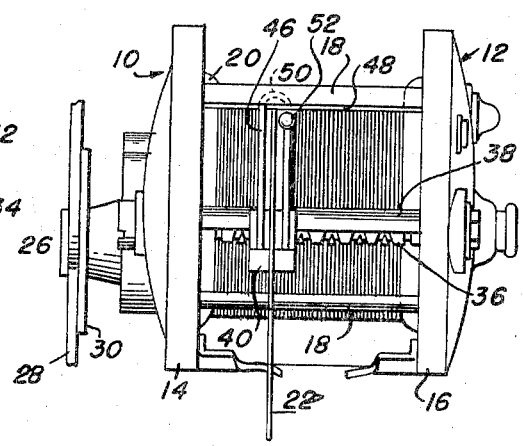
Figure 2 is a front elevational view of the fishing reel shown in Figure 1.

Referring now more particularly to the drawings, I have shown my invention as applied to a conventional surf casting fishing reel, generally indicated at 10. The reel 10 includes a frame 12 having opposed end frame members 14 and 16 connected in spaced relation by a series of parallel cross members 18. Journalled in the frame 12 between the central portions of the end members 14 and 16 is a spool 20 which is adapted to carry a fishing line 22 thereon. The end of the spool adjacent the frame member 14 is provided with a gear (not shown) which is adapted to mesh with a gear 24 mounted on one end of a crank shaft 26 journalled in the end member 14. The outer end of the shaft 26 has mounted thereon a crank 28 and a drag star 30 is connected therewith in a manner well known in the art.

In order to disconnect the spool 20 from driving relation with the crank 28, a suitable clutch mechanism (not shown) is provided which is adapted to be actuated by a lever 32, as shown in Figure 1. It will be understood that the above structure is of a conventional nature and forms no part of the present invention.

My invention relates to a novel level winding mechanism which is adapted to be mounted on a fishing reel of the type described above. In order that the level winding mechanism of my invention may be disconnected from driving relation with the spool 20, I have provided a gear 34 which is adapted to mesh with the gear 24 on the crank shaft 26. Gear 34 is mounted on the end of a conventional double worm shaft 36 which is journalled between the end frame mambers 14 and 16. If desired, a cover 38 may be provided to protect the shaft 36 from salt water and other deteriorating effects. Mounted on the double worm shaft 36 for longitudinal reciprocating movement thereby is a traversing head 40 which is adapted to carry the novel line guiding element 42 of my invention.

The line guiding element 42 includes a pair of parallel spaced guide wires 44 and 46 which are preferably constructed of straight metal wires. The guide wires 44 and 46 are fixed at one of their ends to the head 40 and extend upwardly and rearwardly therefrom toward one of the cross members 18. This cross member 18 is preferably provided with a longitudinal groove 48 which extends throughout the length thereof. The upper end of the guide wire 46 is preferably curved, as at 50, so as to be disposed within the groove 48 for longitudinal sliding movement. The other guide wire 44 terminates short of the cross member 18, and a ball of metal 52 is preferably provided on the upper free end thereof. The ball of metal is preferably disposed so as to provide a slight unobstructed gap between the lower surface of the cross member 18 and the upper free end of the guide wire 44, as is clearly illustrated in the drawings.

When it is desired to make a cast with the use of my invention, the clutch lever 32 is actuated to disengage the spool 20 from driving relation with the crank shaft 26. This leaves the double worm shaft 36 in driving relation with the crank 28 through gears 24 and 34. The line 22 is then removed from between guide wires 44 and 46 by the operator's grasping the line and pulling it upwardly until it engages the undersurface of the cross member 18, and then moving it laterally from between the guide wires through the gap provided by the ball 52. The traversing head 40, together with the line guiding element 42, is then operated by the crank 28 until it is moved into an extreme position adjacent one of the end members. One such position of the traversing head is shown in dotted lines in Figure 3 with the line 22 being disposed outside of the guide wire. With the level winding mechanism in this condition, the cast may then be made and the line will freely pay out from the spool, as shown at 22' in broken lines in Figure 3, without any movement or interference of the level winding mechanism.

Figure 3:
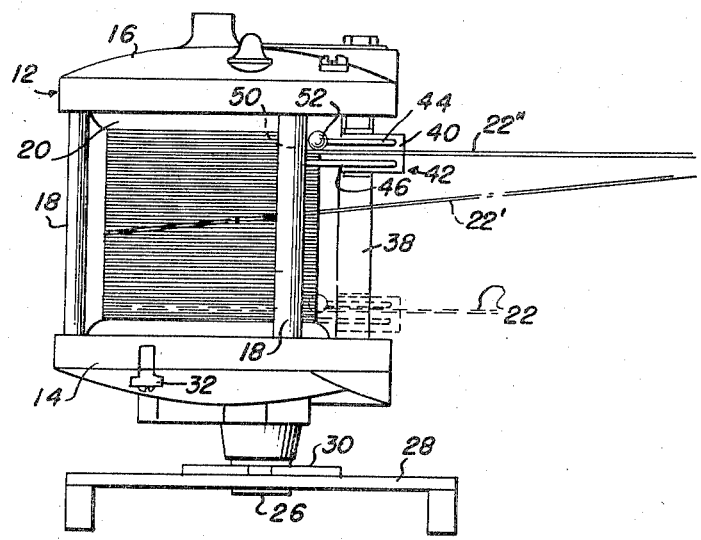
Figure 3 is a top plan view thereof.

When it is desired to reel in the line, the crank 28 is rotated by the operator to move the traversing head 40 until it has reached a position wherein the guide wires are in alignment with the position of the line, such as shown in Figure 3 at 22''. The line is then grasped by the operator and moved upwardly until it engages the bottom surface of the cross member 18, and moved laterally through the gap provided by the guide wire 44 until it is disposed between the guide wires. The clutch lever 32 is then actuated to bring the spool into driving relation with the crank 28 so that the line may be reeled in.

Thus, it can be seen that I have provided a level winding mechanism which may be easily moved into an inoperative position to enable the line to freely pay out during casting, and which may be easily moved into an operative relationship when it is desired to reel in the line. It has been found in practice that the simple manipulations necessary to operate the level winding mechanism of my invention can be easily performed with little or no loss of time. Moreover, the useful life of the mechanism is greatly extended in comparison with the conventional mechanism and casts of a greater length are made possible.

The particular construction of the line guiding element 42 is such as to enable an operator to quickly and easily effect the removal and insertion of the line. But, the element maintains the line in proper relationship once it has been established. In this regard, it is to be noted that the shape of the lower portion of the ball 52 tends to prevent the accidental removal of the line from between the guide wires during the reeling-in operation, and conversely tends to prevent the line from being accidentally disposed between the guide wires during the casting operation. Moreover, the structure and disposition of the ball is such that it will aid in guiding the line through the gap. Thus, it will be noted that once the line has been disposed adjacent the undersurface of the cross member 18, the upper surface of the ball will serve to guide the line out of or into the line guiding element 42. In addition, the disposition of the upper end of the guide wire 46 within the groove 48 of the cross member 18 greatly strengthens the guiding element, and in this regard, it is to be noted that the curved end 50 provides an extensive area of sliding contact, which provides added strength and prevents the guide wire from being accidentally displaced therefrom.

It is to be understood, however, that the form of the invention herewith shown and described is to be taken as the preferred embodiment of the same and that various changes may be made without departing from the spirit of the invention or the scope of the appended claims.

I claim:

1. In a fishing reel, a frame, a double worm shaft journalled in said frame, a parallel cross member spaced from said shaft, said cross member having a longitudinal groove formed therein, a traversing head mounted on said shaft for longitudinal reciprocating movement thereby, and a pair of spaced guide wires extending from said head, the free end of one of said wires being disposed within said groove and the free end of the other of said wires being spaced from said cross member.

2. In a fishing reel as defined in claim 1, wherein said guide wires are parallel throughout their common extent.

3. In a fishing reel as defined in claim 2, wherein the free end of said one guide wire disposed within said groove is curved.

4. In a fishing reel as defined in claim 1, wherein a ball is provided on the free end of said other guide wire.

5. In a fishing reel of the type having a crank, a spool and means for connecting said crank and spool so that a line disposed on the latter may be reeled in and for disconnecting said crank and spool so that the line may freely pay out for casting, a level winding mechanism adapted to guide the line as it is reeled in and to be moved to an inoperative position for casting comprising a double worm shaft, a gear on said shaft for directly connecting said shaft to said crank, a parallel cross member spaced from said shaft, said cross member having a longitudinal groove formed therein, a traversing head mounted on said shaft for longitudinal reciprocating movement thereby, and a pair of spaced guide wires carried by said head, the free end of one of said wires being disposed within said groove and the free end of the other of said wires being spaced from said cross member to provide a gap whereby the line may be inserted between said guide wires for reeling in and removed therefrom for casting.

6. In a fishing reel of the type defined in claim 5 wherein the free end of said other guide wire is provided with a ball for preventing the line from entering between said guide wires during casting and from leaving said guide wires during reeling in.

No references cited.